United States Patent
Lee et al.

(10) Patent No.: US 12,250,494 B2
(45) Date of Patent: Mar. 11, 2025

(54) METHOD AND SYSTEM FOR OPTICAL MONITORING OF UNMANNED AERIAL VEHICLES BASED ON THREE-DIMENSIONAL LIGHT FIELD TECHNOLOGY

(71) Applicant: SHENZHEN VISION POWER TECHNOLOGY CO., LTD., Shenzhen (CN)

(72) Inventors: Ying Chiu Herbert Lee, Hong Kong (CN); Li-Hua Lilly Li, Hong Kong (CN)

(73) Assignee: Shenzhen Vision Power Technology Co., Ltd., Shenzhen (CN)

( * ) Notice: Subject to any disclaimer, the term of this patent is extended or adjusted under 35 U.S.C. 154(b) by 433 days.

(21) Appl. No.: 17/602,491

(22) PCT Filed: Mar. 10, 2020

(86) PCT No.: PCT/CN2020/078496
§ 371 (c)(1),
(2) Date: Oct. 8, 2021

(87) PCT Pub. No.: WO2020/207172
PCT Pub. Date: Oct. 15, 2020

(65) Prior Publication Data
US 2022/0210375 A1    Jun. 30, 2022

(30) Foreign Application Priority Data
Apr. 9, 2019    (CN) .......................... 201910280348.3

(51) Int. Cl.
*H04N 7/18*    (2006.01)
*G06T 3/4053*    (2024.01)
(Continued)

(52) U.S. Cl.
CPC ............. *H04N 7/18* (2013.01); *G06T 3/4053* (2013.01); *G06V 20/41* (2022.01); *H04N 13/282* (2018.05); *H04N 2013/0081* (2013.01)

(58) Field of Classification Search
CPC ................... G06T 7/557; G06T 3/4053; G06T 2207/10052; G06V 20/41
See application file for complete search history.

(56) References Cited

U.S. PATENT DOCUMENTS

| | | | | |
|---|---|---|---|---|
| 2017/0134639 A1* | 5/2017 | Pitts | ........................... | G06T 5/50 |
| 2018/0329020 A1* | 11/2018 | Hafizovic | ................. | G01S 5/20 |
| 2020/0279387 A1* | 9/2020 | Zhang | .................... | G06F 18/22 |

FOREIGN PATENT DOCUMENTS

| | | | | | |
|---|---|---|---|---|---|
| CN | 107103621 A | * | 8/2017 | ............. | G06T 17/00 |
| CN | 108074218 A | * | 5/2018 | ........... | G06T 3/4076 |

\* cited by examiner

*Primary Examiner* — Boubacar Abdou Tchoussou
(74) *Attorney, Agent, or Firm* — Troutman Pepper Locke LLP; James E. Schutz; Jacob M. Burr (57) ABSTRACT

Disclosed in the present invention are a method and a system for monitoring unmanned aerial vehicles based on three-dimensional light field technology. Provided is an unmanned aerial vehicle monitoring method based on three-dimensional light field technology, comprising: beginning unmanned aerial vehicle monitoring; by means of a light field camera, acquiring low resolution video image information; determining whether the acquired video image information is an unmanned aerial vehicle; performing graphic reconstruction on an unmanned aerial vehicle image therein; and acquiring reconstructed light field image depth and position information to monitor the unmanned aerial vehicle and emitting an alert. The method and the system for monitoring in the present invention are able to acquire a (Continued)

clear stereoscopic image, thus raising efficiency and accuracy in the process of unmanned aerial vehicle monitoring or detection.

18 Claims, 7 Drawing Sheets

(51) Int. Cl.
*G06V 20/40* (2022.01)
*H04N 13/00* (2018.01)
*H04N 13/282* (2018.01)

METHOD AND SYSTEM FOR OPTICAL MONITORING OF UNMANNED AERIAL VEHICLES BASED ON THREE-DIMENSIONAL LIGHT FIELD TECHNOLOGY

CROSS REFERENCE TO RELATED APPLICATIONS

The application claims priority to PCT Application No. PCT/CN2020/078496, filed on 10 Mar. 2020, which claims priority to CN Patent Application No. 201910280348.3, filed on 9 Apr. 2019, the contents of which are hereby incorporated by reference into the present application.

TECHNICAL FIELD

The present invention relates to the field of monitoring unmanned aerial vehicles, and particularly relates to a method and a system for monitoring unmanned aerial vehicles based on light field technology.

BACKGROUND

With a development of unmanned aerial vehicle technology, (in consideration of the definitions of unmanned aerial vehicle ("UAV") and drone, the unmanned aerial vehicle mentioned in full text of the present case could be replaced by drone) there exists an extensive demand for an improvement on a system of monitoring an unmanned aerial vehicle or drone, and usually, a monitoring system in which a radar is combined with a camera is adopted in prior art. Radar monitoring technology is susceptible to deception by stealth technology, and has a poor low-altitude monitoring effect, and generally, the camera has a low resolution. Chinese Patent Application No. 201810128587.2 discloses a system of monitoring an unmanned aerial vehicle and a supervision method thereof. In the method, an image in an area is scanned using a software method, stereoscopic vision is formed by a first camera and a second camera to judge whether a suspicious target exists in the image, and the suspicious target is tracked and photographed by calculating an accurate position of the suspicious target. The technology mainly achieves an improvement on software. Chinese Patent Application No. 201810396720.2 discloses an unmanned aerial vehicle detection method and apparatus as well as an electronic device. Mainly from the perspective of software, a camera on a detection platform is controlled to rotate, during which a rotation instruction is sent to a motor of a rotating platform, such that the motor drives a plurality of cameras on the rotating platform to rotate by a preset angle; a stop instruction is sent to the motor, such that the motor controls the rotating platform to stop rotating after the rotating platform is rotated by the preset angle; when it is determined that the above-mentioned plurality of cameras have been stopped for a preset time, the above-mentioned plurality of cameras are controlled to perform one shoot to obtain a plurality of images; image recognition is performed on the plurality of images to determine whether an unmanned aerial vehicle exists in a monitored area; and if no unmanned aerial vehicle exists in the monitored area, the above steps are repeated. The above two prior arts have a drawback that a distant unmanned aerial vehicle and a spatial position of a detected unmanned aerial vehicle are unable to be accurately determined due to lack of high-resolution images.

In the prior art, two methods exist to improve the resolution of images. One method is reduction of a pixel size. As the pixel size decreases, a signal to noise ratio (SNR) thereof decreases. Therefore, the reduction of the pixel size has a limit, and if this limit is exceeded, there exists a case where the image resolution is degraded due to an increase in shot noise. Another method is incorporation of more photodetectors into a chip, thereby increasing a size of the sensor chip. Similarly, this method comes at the cost of an increased chip capacitance, which in turn reduces a charge transmission rate, and a longer time for capturing images is required. In addition, this method may significantly increase the size and cost of the sensor chip. In order to obtain an optimized solution and take cost benefits into account, when a high-resolution photo is taken, it is necessary to appropriately shorten a shooting time thereof and reasonably improve quality. For unmanned aerial vehicle detection, the optimized high-resolution image may still be insufficient to satisfy most of practical application environments.

There exists a need for a new high-resolution and stable monitoring method and system which obtain a clear stereo image so as to improve efficiency and accuracy in a process of monitoring or detecting the unmanned aerial vehicle.

SUMMARY

An object of the present invention is to provide a new high-resolution and stable monitoring method and system which obtains a clear stereo image so as to improve efficiency and accuracy in a process of monitoring or detecting an unmanned aerial vehicle. An object of the present invention is to provide a method of monitoring an unmanned aerial vehicle based on light field technology, comprising: beginning monitoring an unmanned aerial vehicle; by means of a light field camera, acquiring video image information having low resolution; determining whether the acquired video image information shows the unmanned aerial vehicle; performing graphic reconstruction on an unmanned aerial vehicle image therein; and acquiring depth and position information of the reconstructed light field image to monitor the unmanned aerial vehicle and sending an alert. The image reconstruction step is a super-resolution method based on a model or a super-resolution method based on multiple frames. The super-resolution method based on multiple frames is a method for reconstructing a high-resolution (HR) image from a group of relatively low-resolution (LR) images, which may also be referred to as a multi-frame image super-resolution method; the reconstruction step is performed using correlation between the recorded relatively low-resolution (LR) images. The step of reconstructing the unmanned aerial vehicle image comprises (a) a light field image generated by a micro-lens array; (b) a sequence of sub-aperture images arranged according to a distance of a focal plane; (c) a single sub-aperture image; (d) multi-view-angle sub-aperture images arranged according to positions on a main lens; wherein the multi-view-angle sub-aperture image array is obtained after an original compound eye image is processed. After the step of reconstructing the unmanned aerial vehicle image, the reconstructed light field image is combined with an estimated depth map to refocus the light field images, and the refocused images are combined to obtain all focused light field images. According to the above-mentioned synthetic aperture technology, pixel points in the original compound eye image are re-projected into each sub-aperture image, such that a scenario is imaged from different view angles, light field information in the original compound eye image is further synthesized and extracted, a multi-view-angle view of an imaging space is obtained, and a digital refocusing sequence and a depth map are obtained. The following formulas are adopted:

$$I(x, y) = \int_u^{u+\Delta u} \int_v^{v+\Delta v} L(u, v, x, y) du dv \quad (3)$$

$$\frac{u-x}{u-x'} = \frac{z}{z'} = k \quad (4)$$

$$L'(u, v, x', y') = L(u, v, kx' + (1-k)u, ky' + (1-k)v) \quad (5)$$

$$I'(x', y') = \int \int L(u, v, kx' + (1-k)u, ky' + (1-k)v) du dv \quad (6)$$

wherein I and I' represent coordinate systems of a primary imaging surface and a secondary imaging surface; and L and L' represent energy of the primary imaging surface and the secondary imaging surface.

After acquisition of depth data of a photographed object in each micro-lens, the depth map of the whole image may be calculated, and a 3D video image may be shot. No proper focusing operation is required before the video image information is obtained; and all depth map information may be captured by one shoot. The method further comprises: classifying image frames of the video image; performing semantic segmentation on the image frames; detecting the unmanned aerial vehicle image; and performing instance segmentation on the unmanned aerial vehicle image to cluster pixels of different objects. The method further includes: analyzing a super-resolution frame of the video image after the light field image is processed and decoded; for a given preprocessed monitoring video, remolding a frame sequence in the video into a data matrix; analyzing and encoding the data matrix to extract main features of an image; and identifying an unmanned aerial vehicle image feature pattern by utilizing machine learning technology, and then detecting the unmanned aerial vehicle in the video image. The machine learning technology is RCNN, Fast RCNN, YOLO or SSD method.

The method and the system for optical monitoring unmanned aerial vehicles based on three-dimensional light field technology according to the present invention may isolate vibration in a monitoring process, thereby improving the efficiency and accuracy in the process of monitoring or detecting the unmanned aerial vehicle.

BRIEF DESCRIPTION OF THE DRAWINGS

To describe the technical solutions in the embodiments of the present invention clearly, the following contents briefly describe the accompanying drawings required for the embodiments. Apparently, the accompanying drawings in the following description show merely some examples of the present invention, and a person of ordinary skill in the art may still derive other drawings from these accompanying drawings without innovative efforts.

DETAILED DESCRIPTION

Embodiments of the present invention will now be described with reference to the accompanying drawings. The present invention may, however, be implemented in many different forms and should not be construed as being limited to the embodiments set forth herein. These embodiments are provided only for thoroughness and completeness of the present invention, such that the scope of the present invention may be fully conveyed to those skilled in the art. The terms used in the detailed description of the embodiments illustrated in the accompanying drawings are not intended to limit the present invention.

Figure 1:
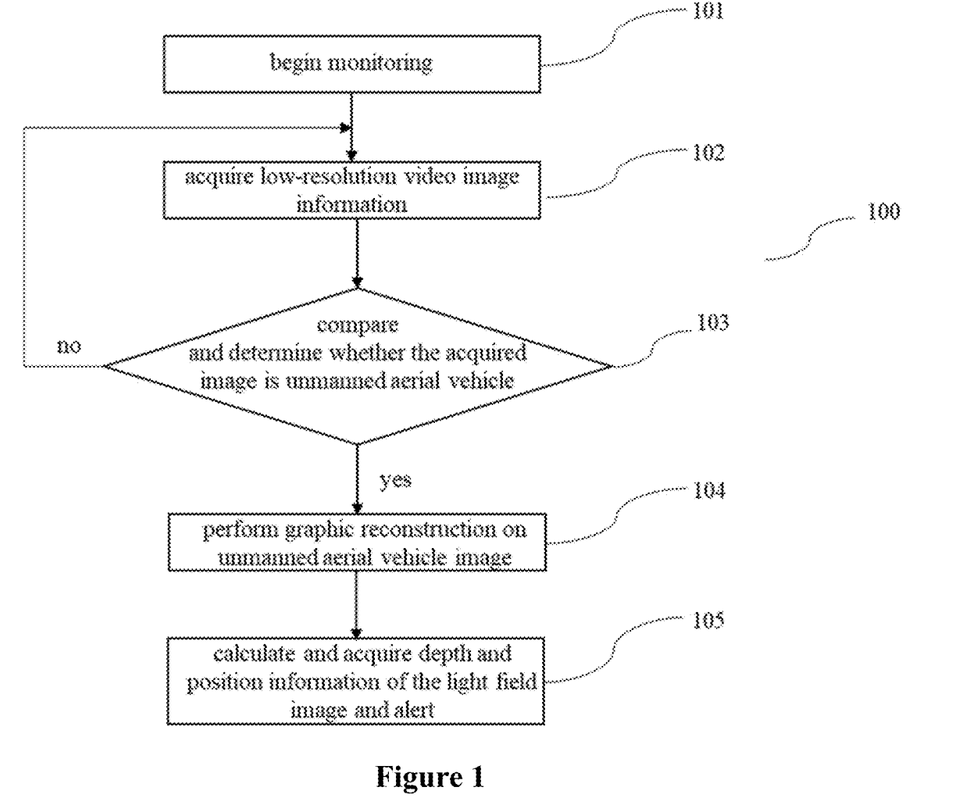
FIG. 1 is a flow chart 100 of a method of monitoring an unmanned aerial vehicle according to the present invention.

FIG. 1 is a flow chart 100 of a method of monitoring an unmanned aerial vehicle according to the present invention. At step 101, a system of monitoring an unmanned aerial vehicle begins monitoring; at step 102, video image information is acquired over a greater range, the video image information having a relatively low resolution; at step 103, by comparison with a stored database, it is determined whether the obtained relatively low-resolution image conforms to a shape of an unmanned aerial vehicle in the database, once a target is matched, proceeding to step 104, and tracking a suspicious target by a telephoto lens focused on a locked target, thereby obtaining a high-resolution image and light field information of the target unmanned aerial vehicle using a method of reconstructing the unmanned aerial vehicle image, and proceeding to step 105; in the case of the target is mismatched, returning to the step 102, and the step of acquiring video image information with the relatively low resolution over a greater range is repeated; and at step 105, after calculation and verification are performed on the low-resolution video image information again, depth and position information of the light field image is calculated and obtained and a user or a control tower is alerted. That is, once the high resolution image has a high similarity to the shape information of the unmanned aerial vehicle in the database, an alarm signal is sent to the monitoring system, and the depth and position information of the unmanned aerial vehicle is also sent back to a surveillance center.

Figure 2:
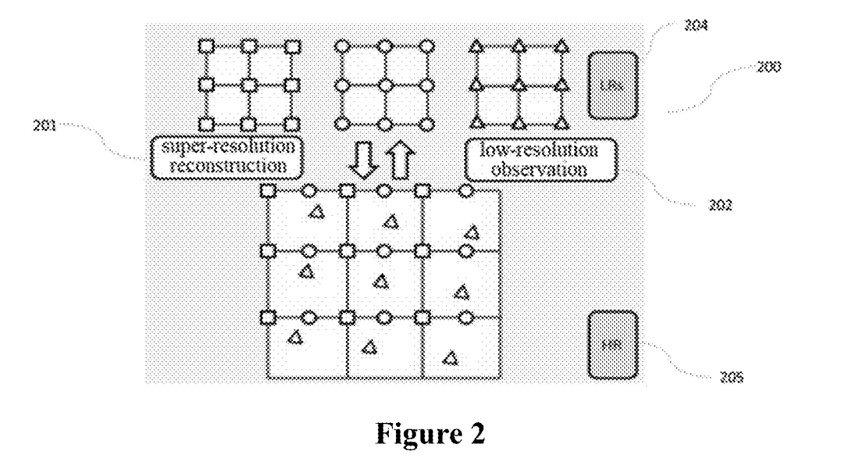
FIG. 2 is a schematic diagram of an image reconstruction step of the method of monitoring the unmanned aerial vehicle according to the present invention.

FIG. 2 is a schematic diagram of the image reconstruction step of the method of monitoring the unmanned aerial vehicle according to the present invention. In order to obtain the high-resolution image, the method is mainly divided into two categories: a super-resolution method based on a model and a super-resolution method based on multiple frames. In the super-resolution method based on a model, a super-resolution image is realized using different assumed noise models. The present invention provides a method for reconstructing a high-resolution (HR) image from a group of relatively low-resolution (LR) images, which may also be referred to as a multi-frame image super-resolution method; the reconstruction is performed using correlation between the recorded relatively low-resolution (LR) images. The correlation between the images may be obtained by measurement or calculated by means of an assumed modeling operation.

Figure 4A:
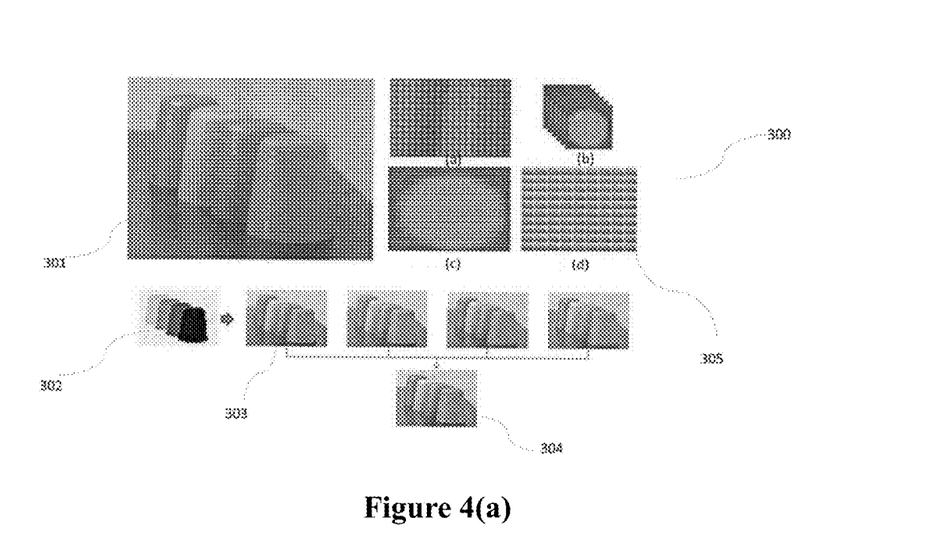
FIG. 4(a) is an exemplary view of a decoding operation in the image reconstruction step of the method of monitoring the unmanned aerial vehicle according to the present invention.
Figure 4B:
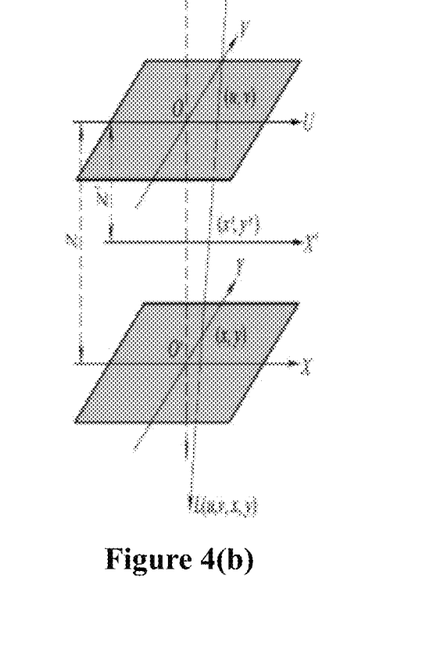
FIG. 4(b) is a diagram of a principle of performing a digital refocusing operation on a synthetic aperture image in the method of monitoring the unmanned aerial vehicle according to the present invention.

FIG. 4(a) is an exemplary view of a decoding operation in the image reconstruction step of the method of monitoring the unmanned aerial vehicle according to the present invention. The purpose for the decoding process 300 is that image reconstruction is performed on an obtained light field image 301 at step 305, the reconstructed light field image is combined with an estimated depth map 302 to refocus 303 the light field image, and the refocused images 303 are combined to obtain all focused light field images 304. The image reconstruction performed at step 305 is a key step for decoding the light field image, and involves (a) a light field image obtained by a micro-lens array; (b) a sequence of sub-aperture images (arranged according to a distance of a focal plane); (c) a single sub-aperture image; (d) a sequence of sub-aperture images (arranged according to positions on a main lens). The diagram 305(d) shows a multi-view-angle sub-aperture image array obtained by a camera system in the present invention, and the multi-view-angle sub-aperture image array is obtained after an original compound eye image is processed. According to the above-mentioned synthetic aperture technology, pixel points in the original compound eye image are re-projected into each sub-aperture image, such that a scenario is imaged from different view angles. Light field information in the original compound eye image may be further synthesized and extracted, a multi-view-angle view of an imaging space is obtained, a digital refocusing sequence is further obtained, and a depth map is further obtained. FIG. 4(b) is a diagram of a principle of performing a digital refocusing operation on a synthetic aperture image in the method of monitoring the unmanned aerial vehicle according to the present invention, and the synthetic aperture image is subjected to the digital refocusing operation using the principle shown in FIG. (4):

$$I(x, y) = \int_{u}^{u+\Delta u} \int_{v}^{v+\Delta v} L(u, v, x, y) du dv \quad (3)$$

$$\frac{u-x}{u-x'} = \frac{z}{z'} = k \quad (4)$$

$$L'(u, v, x', y') = L(u, v, kx' + (1-k)u, ky' + (1-k)v) \quad (5)$$

$$I'(x', y') = \int \int L(u, v, kx' + (1-k)u, ky' + (1-k)v) du dv \quad (6)$$

wherein I and I' represent coordinate systems of a primary imaging surface and a secondary imaging surface; and L and L' represent energy of the primary imaging surface and the secondary imaging surface.

After acquisition of depth data of a photographed object in each micro-lens, the depth map of the whole image may be calculated, and thus a 3D video image may be shot.

Figure 3A:
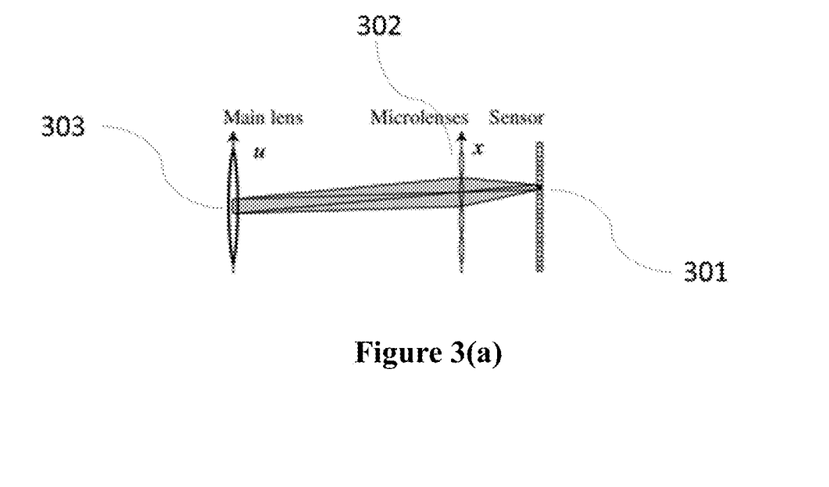
FIGS. 3(a) and 3(b) are schematic diagrams of a light field imaging system in the present invention.
Figure 3B:
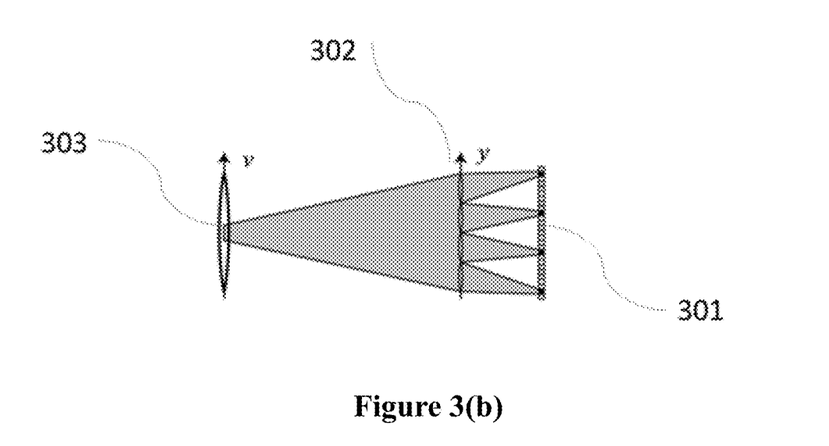

At the above-mentioned step 104, the high-resolution image and the light field information of the target unmanned aerial vehicle is obtained by using the light field camera. Different from conventional cameras, the light field camera captures not only two-dimensional images, but also the direction of incident light rays. FIGS. 3(a) and 3(b) show a mechanism of a light field imaging system with a micro-lens array 302 in front of a CMOS sensor 301. In FIG. 3(a), all light rays passing through pixels pass through parent micro-lenses thereof and a conjugate square (sub-aperture) on a main lens 303. In FIG. 3(b), all light rays passing through the sub-aperture are focused by the corresponding pixels under different micro-lenses. These pixels form a photo seen through the sub-aperture.

Figure 4C:
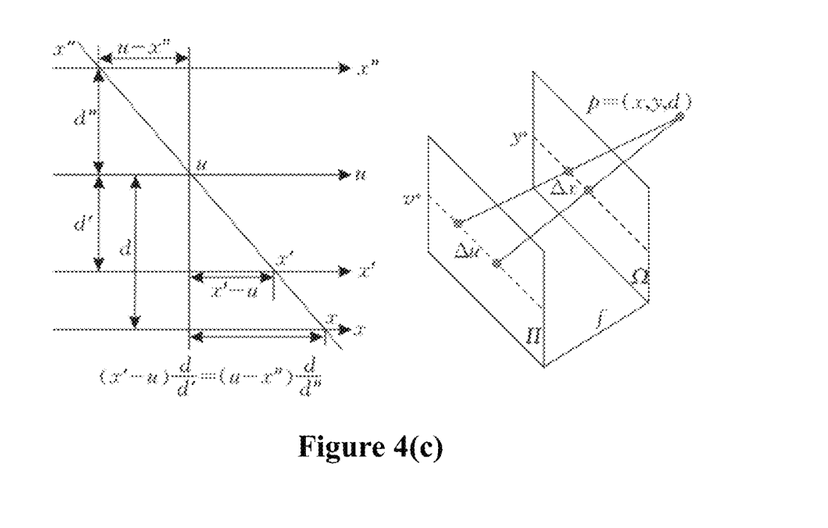
FIG. 4(c) is a schematic diagram of a principle of calculating a refocused image by moving a sub-aperture image of the method of monitoring the unmanned aerial vehicle according to the present invention.

A light field image I(x,y) may be represented by the formula:

$$I(x,y) = \iint L_F(u,v,x,y) du dv \quad (1)$$

wherein (u,v,x,y) represents light traveling along a light ray intersecting the main lens at (u,v) and a micro-lens plane at (x,y), and full aperture is used. FIG. 4(c) is a schematic diagram of a principle of calculating a refocused image by moving a sub-aperture image of the method of monitoring the unmanned aerial vehicle according to the present invention, and the refocused image may be calculated by moving the sub-aperture image in the manner shown in FIG. 4(c).

A shifted light field function may be represented as:

$$L_{F'}(u, v, e', y') = L_F\left(u, v, u + (x' - u)\frac{d}{d'}, v + (y' - v)\frac{d}{d'}\right) \quad (2)$$

Light field imaging technology allows refocusing the image and estimating a depth map of a scenario. A basic depth range is computed by means of a light field, and the position of the unmanned aerial vehicle is determined by combining the depth range with a position on the image.

Figure 3C:
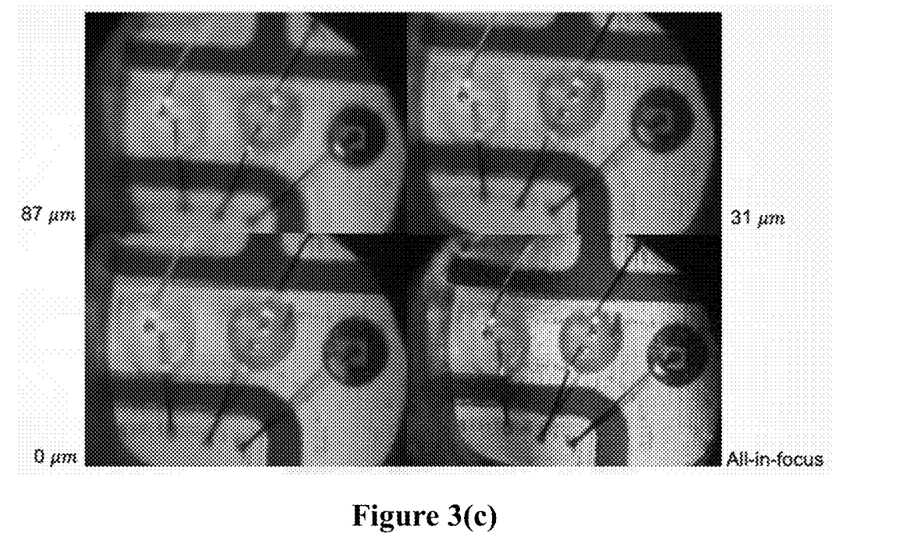
FIG. 3(c) is an exemplary view of a processed light field image.

For fabrication of semiconductors applied on a chip board, a compound eye may be used to find a maximum loop height of an aluminum bonding wire, a first bonding height on a chip and a second bonding height on a substrate. FIG. 3(c) is exemplary views of processed light field images. In FIG. 3(c), a greater number (μm) in the positive direction means a closer virtual focal plane towards an objective lens. The focal plane on a surface of the objective lens is calibrated to 0 μm. In the processed light field images, the upper left image of FIG. 3(c) shows a top wire layer, the upper right image of FIG. 3(c) shows a middle layer, the lower left image of FIG. 3(c) shows a bottom metal layer, and the lower right image of FIG. 3(c) shows an all-in-focus image. Auto-focusing software will be developed to capture all wire images without commanding any mechanical movement of a vertical axis. Real-time AOI software will be developed and used in conjunction with the auto-focusing software. A user interface will display the image shot by the camera and the all-in-focus image, and any detected defect will be marked.

In the present invention, the spatial position of the monitored unmanned aerial vehicle is located by using the light field imaging technology. First, no proper focusing operation is required before photography. A post-focusing operation may be performed after the image is captured. Second, all depth map information may be captured by using only one shoot. Three-dimensional information of the position of any object appearing on the shot image may be determined by using the depth map information.

A distance between the unmanned aerial vehicle and a camera may be measured by using a distance/depth calculation function. Light field technology and structured light vision technology are mainly utilized in the measurement process. A light field is a function which may describe the amount of optical radiation transmitted through each aspect of each point in a space (that is, describe radiative transmission characteristics of light in a three-dimensional space). All useful information in the scenario may be captured by utilizing light field photography technology. The light field camera (also known as a full-aperture camera) may capture both information relevant to an intensity of light in the scenario and information relevant to a direction of propagation of the light in the space. A micro-lens array serves as a core component of the light field camera. Each micro-lens covers a plurality of optical sensor pixels and may separate light radiated to the micro-lens to form a small image on the underlying pixel. The application of the micro-lens array in imaging is technology inspired by animal vision and therefore, the micro-lens array is also called "compound eye" in the light field camera. By combining the main lens with the compound eye, the 4D light field information may be recorded on the optical sensor, and the light field image decoding process is further realized. A functional module mainly includes the following three aspects: image reconstruction, refocusing and depth map estimation. As a basis of light field decoding, the image reconstruction mainly involves ray tracking of a 4D light field; the refocusing is essentially one example of the synthetic aperture technology; the depth map obtained by estimation from the above two steps is always a portal into a three-dimensional world. After the light field image is decoded, the distance between the target and the camera may be calculated.

Figure 5:
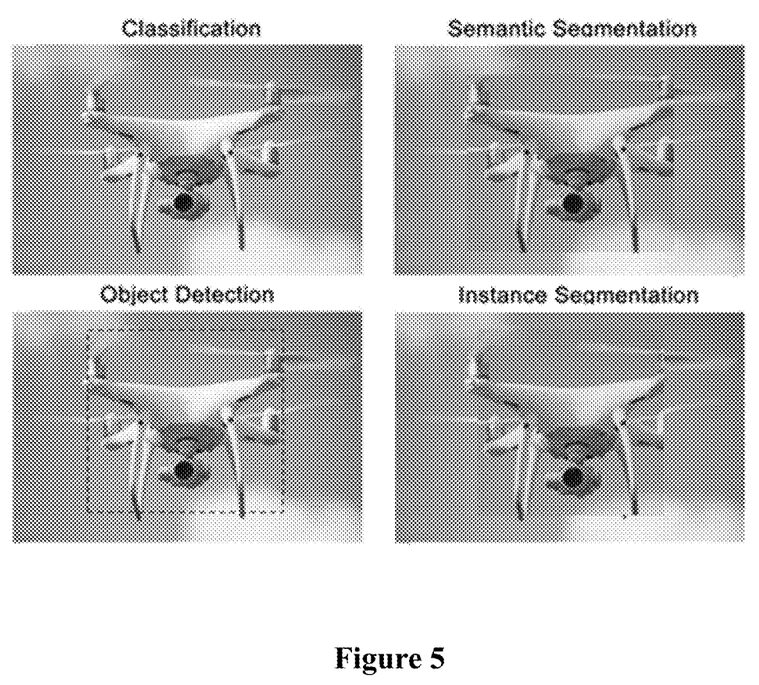
FIG. 5 is an exemplary view of target detection and image tracking steps in the method of monitoring the unmanned aerial vehicle according to the present invention.

FIG. 5 is an exemplary view of target detection and image tracking steps in the method of monitoring the unmanned aerial vehicle according to the present invention. As shown in the upper left diagram of FIG. 5, image frames are classified; as shown in the upper right diagram of FIG. 5, the image frame is segmented semantically; as shown in the lower left diagram of FIG. 5, the image is detected; and as shown in the lower right diagram of FIG. 5, instance segmentation is performed, and then pixels of different objects are clustered.

Figure 6A:
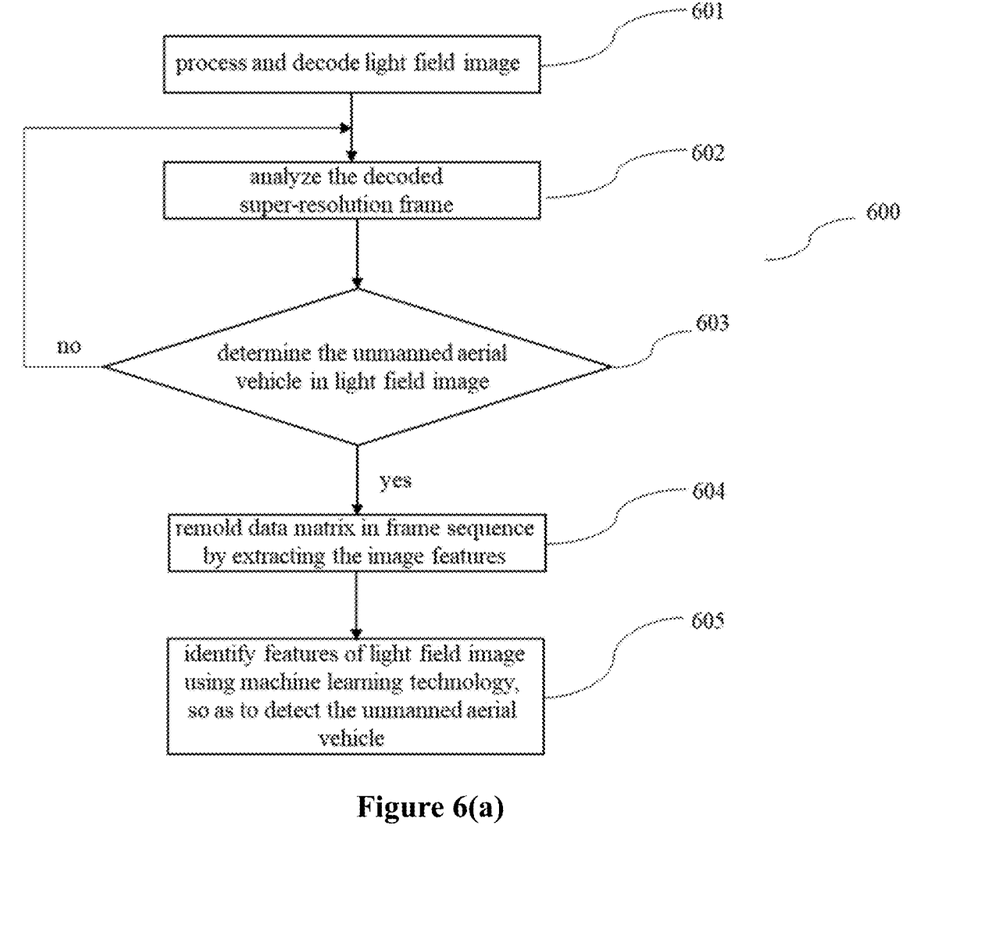
FIG. 6(a) is a flow chart of target monitoring and image tracking steps in the method of monitoring the unmanned aerial vehicle according to the present invention.

FIG. 6(a) is a flow chart 600 of target monitoring and image tracking steps in the method of monitoring the unmanned aerial vehicle according to the present invention. At step 601, super-resolution frames in a monitoring video are automatically analyzed at step 602 after the light field image is processed and decoded. The analysis process is built on machine deep learning and an intelligent theory thereof. A module has a main purpose of monitoring the unmanned aerial vehicle existing in the video and intelligently tracking the target. The module has the two following functions: target detection and image tracking. The target detection function of the system may realize the detection of the unmanned aerial vehicle on the basis of feature extraction and video analysis. At step 604, given a pre-processed monitoring video, a frame sequence in the video is remolded into a data matrix by the system. The data matrix is then analyzed and encoded to extract main features of the image, thereby reducing the dimension of the data matrix and further improving a visibility of basic information in the video. At step 605, identifying an unmanned aerial vehicle image feature pattern is achieved by utilizing machine learning technology, and then the unmanned aerial vehicle in the video is detected.

Figure 6B:
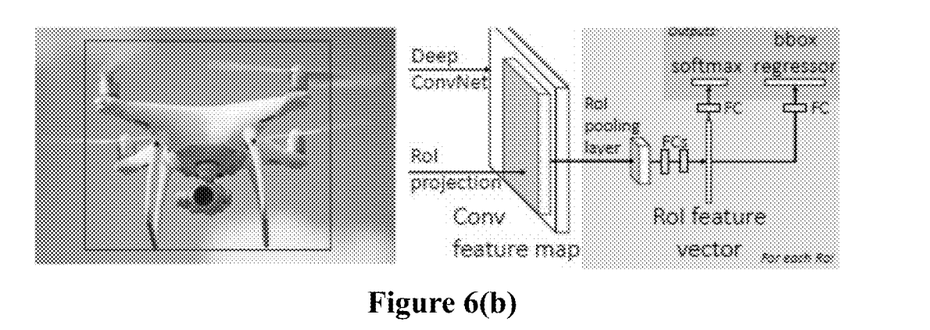
FIG. 6(b) is a schematic structural diagram of a network used in a Fast RCNN method in the method of the unmanned aerial vehicle according to the present invention.

FIG. 6(b) is a schematic structural diagram of a network used in a Fast RCNN method in the method of monitoring the unmanned aerial vehicle according to the present invention. A deep learning model, such as a RCNN, a Fast RCNN, YOLO, a SSD, or the like, may be adopted. Taking the Fast RCNN as an example, a redundant feature extraction in R-CNN is removed, and the whole image is input into a neural network for one feature extraction as follows: replacing a last max pooling layer with a ROI pooling layer, introducing a bbox regression layer at the same time, and extracting corresponding suggested proposal features. Two parallel connection layers (i.e., a cls score layer and a bbox score layer) are adopted at the end of the Fast RCNN network, such that a classification result and a regression result may be output simultaneously, and an end-to-end multitask training process is realized for the first time. The training step comprises inputting an input image and a plurality of regions of interest (RoI) into a fully convolutional network. Each RoI is assembled into a fixed-size feature map and then mapped to a feature vector through a fully connected layer. Each RoI of the network has two output vectors: a softmax probability and each-class bounding box regression offset. In this architecture, the end-to-end training process is performed by means of a multi-task loss. The monitoring and tracking process is completed by downloading the Fast RCNN model and the following training process: 1) preparing training data, wherein picture information corresponding to Imageset is in label/label.txt, and includes three types including a bbox position of roi, a picture name and a belonged category (bird, UAV, plane); 2) extracting a suggestion box for each training picture using a selective search; 3) reading the picture information by using the label.txt to generate codes of bboxes; 4) by extracting ss, generating information of the suggestion box of each picture.

After the unmanned aerial vehicle is monitored and identified, the camera is aligned with the unmanned aerial vehicle and refocused to capture a close shot photograph thereof so as to acquire more relevant information. Since the unmanned aerial vehicle always moves in the air, the camera should be tilted towards the direction of the target to form high-quality images. Therefore, image tracking technology is utilized in the system to lock a region of the unmanned aerial vehicle, and intelligent analysis is performed to predict a flight path of the unmanned aerial vehicle. After the unmanned aerial vehicle is detected and tracked, a target scenario and the flight path are transmitted to a motion control unit. The camera is driven by a hexapod robot to be stably aligned with the unmanned aerial vehicle.

Software of the system manages all the functional modules to work together. The monitoring video is automatically analyzed by the system to detect and track the unmanned aerial vehicle. The light field technology is used for calculation of the target distance and refocusing for the photograph scenario. Resolution reconstruction technology guarantees the imaging quality of all processes. The algorithm involves digital image enhancement, light field decoding, pattern recognition, and machine intelligence. Software and hardware which are coordinated and interact with each other implement a high-precision and full-automatic unmanned aerial vehicle monitoring system.

Figure 7:
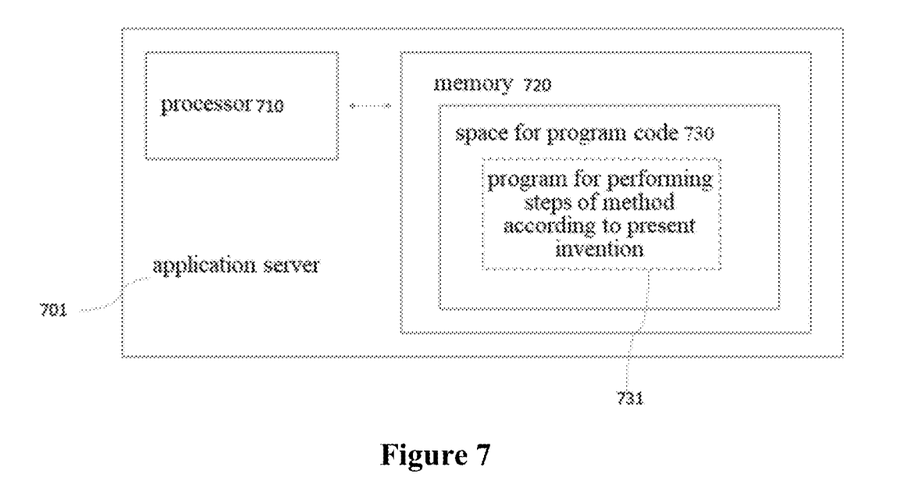
FIG. 7 schematically shows a block diagram of a server for performing the method according to the present invention.
Figure 8:
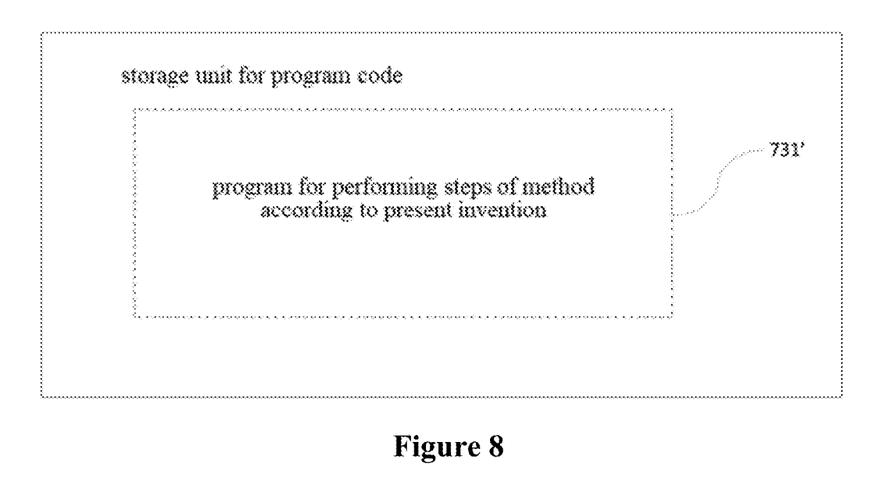
FIG. 8 schematically shows a storage unit configured to hold or carry a program code for implementing the method according to the present invention.

FIG. 7 schematically shows a block diagram of a server for performing the method according to the present invention; and FIG. 8 schematically shows a storage unit configured to hold or carry a program code for implementing the method according to the present invention, for example, an application server 701 of the system. The object identification and positioning system server includes a processor 710 which herein may be a general-purpose or special-purpose chip as described above, and a computer program product or a computer-readable medium in the form of a memory 720. The memory 720 may be an electronic memory, such as a flash memory, an EEPROM (electrically erasable programmable read only memory), an EPROM, a hard disk, or a ROM. The memory 720 has a storage space 730 of a program code for performing any step of the method in the above-mentioned method. For example, the storage space 730 for the program code may include respective program codes 731 for implementing various steps in the above method respectively. These program codes may be read from or written into the processor 710. These computer program products include a program code carrier, such as a hard disk, a compact disc (CD), a memory card or a floppy disk. Such a computer program product is typically a portable or fixed storage unit as described with reference to FIG. 8. The storage unit may have a storage segment, a storage space, or the like, arranged similarly to the memory 720 in the server of FIG. 7. The program code may be compressed, for example, in a suitable form. Typically, the storage unit includes a computer-readable code 731', i.e., a code which may be read by a processor, such as the processor 710, and these codes, when executed by the server, cause the server to perform the steps of the method described above. These codes, when executed by the server, cause the server to perform the steps in the method described above.

The "an embodiment", "one embodiment" or "one or more embodiments" mentioned herein means that the specific features, structures or characteristics described in combination with the embodiment(s) would be included in at least one embodiment of the present invention. Moreover, it should be noted that, the wording "in an embodiment" herein may not necessarily refer to the same embodiment.

The above description is only for the purpose of illustrating the technical solutions of the present invention, and any person skilled in the art may make modifications and changes to the above embodiments without departing from the spirit and scope of the present invention. Therefore, the protection scope of the present invention should be subject to the claims. The present invention has been described above with reference to examples. However, other embodiments than the above embodiments are equally possible within the scope of this disclosure. The different features and steps of the present invention may be combined in other ways than those described. The scope of the present invention is limited only by the appended claims. More generally, those skilled in the art will readily appreciate that all parameters, dimensions, materials, and configurations described herein are meant to be exemplary and that actual parameters, dimensions, materials, and/or configurations will depend upon specific applications or applications for which the teachings of the present invention are used.

What is claimed is:

1. Method of monitoring an unmanned aerial vehicle based on light field technology, comprising:
    starting the procedure of unmanned aerial vehicle monitoring;
    obtaining video image information having low resolution by means of a light field camera;
    determining whether the obtained video image information shows the unmanned aerial vehicle;
    reconstructing graphics of an unmanned aerial vehicle image therein; and
    acquiring depth and position information of a reconstructed light field image of said unmanned aerial vehicle image to monitor the unmanned aerial vehicle and sending an alert;
    wherein the step of reconstructing the unmanned aerial vehicle image comprises (a) a light field image generated by a micro-lens array; (b) a sequence of sub-aperture images arranged according to a distance of a focal plane; (c) a single sub-aperture image; and (d) multi-view-angle sub-aperture images arranged according to positions on a main lens; wherein the multi-view-angle sub-aperture image array is obtained after an original compound eye image is processed.

2. The method of monitoring an unmanned aerial vehicle of claim 1, wherein the graphics reconstruction step is a super-resolution method based on a model or a super-resolution method based on multiple frames.

3. The method of monitoring an unmanned aerial vehicle of claim 2, wherein the super-resolution method based on multiple frames is a method for reconstructing a high-resolution (HR) image from a group of relatively low-resolution (LR) images, which can also be referred to as a multi-frame image super-resolution method; the reconstruction step is performed by using the correlation between the recorded relatively low-resolution (LR) images.

4. The method of monitoring an unmanned aerial vehicle of claim 1, wherein after the step of reconstructing the unmanned aerial vehicle image, the reconstructed light field image is combined with an estimated depth map to refocus the light field images, and the refocused images are combined to obtain all focused light field images.

5. The method of monitoring an unmanned aerial vehicle of claim 1, wherein according to synthetic aperture technology, pixel points in the original compound eye image are re-projected into each sub-aperture image, such that a scenario is imaged from different view angles, light field information in the original compound eye image is further synthesized and extracted, a multi-view-angle view of an imaging space is obtained, and a digital refocusing sequence and a depth map are obtained.

6. The method of monitoring an unmanned aerial vehicle of claim 5, wherein the following formulas are adopted:

$$I(x, y) = \int_{u}^{u+\Delta u} \int_{v}^{v+\Delta v} L(u, v, x, y) du dv,$$

$$\frac{u-x}{u-x'} = \frac{z}{z'} = k,$$

$$L'(u, v, x', y') = L(u, v, kx' + (1-k)u, ky' + (1-k)v), \text{ and}$$

$$I'(x', y') = \int \int L(u, v, kx' + (1-k)u, ky' + (1-k)v) du dv,$$

wherein I and I' represent coordinate systems of a primary imaging surface and a secondary imaging surface; and
L and L' represent energy of the primary imaging surface and the secondary imaging surface, and
after acquisition of depth data of a photographed object in each micro-lens, the depth map of the whole image can be calculated, and a 3D video image can be shot.

7. The method of monitoring an unmanned aerial vehicle of claim 1, further comprising:
    classifying image frames of the video image;
    segmenting semantics on the image frames;

detecting the unmanned aerial vehicle image; and segmenting instances on the unmanned aerial vehicle image to cluster pixels of different objects.

8. The method of monitoring an unmanned aerial vehicle of claim 1, further comprising:

analyzing a super-resolution frame of the video image after processing and decoding the light field image;

remolding a frame sequence in the video into a data matrix, for a given preprocessed monitoring video;

analyzing and encoding the data matrix to extract main features of an image; and identifying an unmanned aerial vehicle image feature pattern by utilizing machine learning technology, and then detecting the unmanned aerial vehicle in the video image.

9. The method of monitoring an unmanned aerial vehicle of claim 8, wherein the machine learning technology is region-based convolutional neural networks (RCNN), Fast RCNN, You Only Look Once (real-time object detection, YOLO) or single shot detector (object detection, SSD) method.

10. A system of monitoring an unmanned aerial vehicle based on light field technology, comprising:

a starting means for monitoring an unmanned aerial vehicle;

an image information acquisition means for acquiring video image information having low resolution, by means of a light field camera;

a judgment means for determining whether the acquired video image information shows the unmanned aerial vehicle;

a reconstruction means for performing graphic reconstruction on an unmanned aerial vehicle image therein; and an alerting means for acquiring depth and position information of the reconstructed light field image to monitor the unmanned aerial vehicle and send an alert; and wherein the reconstruction means for performing graphic reconstruction on the unmanned aerial vehicle image comprises (a) a light field image generated by a microlens array; (b) a sequence of sub-aperture images arranged according to a distance of a focal plane; (c) a single sub-aperture image; and (d) multi-view-angle sub-aperture images arranged according to positions on a main lens; wherein the multi-view-angle sub-aperture image array is obtained after an original compound eye image is processed.

11. The system of monitoring an unmanned aerial vehicle of claim 10, wherein the image reconstruction step is a super-resolution method based on a model or a super-resolution method based on multiple frames.

12. The system of monitoring an unmanned aerial vehicle of claim 11, wherein the super-resolution method based on multiple frames is a method for reconstructing a high-resolution (HR) image from a group of relatively low-resolution (LR) images, which can also be referred to as a multi-frame image super-resolution method; the reconstruction step is performed by using correlation between the recorded relatively low-resolution (LR) images.

13. The system of monitoring an unmanned aerial vehicle of claim 10, wherein after the step of reconstructing the unmanned aerial vehicle image, the reconstructed light field image is combined with an estimated depth map to refocus the light field images, and the refocused images are combined to obtain all focused light field images.

14. The system of monitoring an unmanned aerial vehicle of claim 10, wherein according to synthetic aperture technology, pixel points in the original compound eye image are re-projected into each sub-aperture image, such that a scenario is imaged from different view angles, light field information in the original compound eye image is further synthesized and extracted, a multi-view-angle view of an imaging space is obtained, and a digital refocusing sequence and a depth map are obtained.

15. The system of monitoring an unmanned aerial vehicle of claim 13, wherein the following formulas are adopted:

$$I(x, y) = \int_{u}^{u+\Delta u} \int_{v}^{v+\Delta v} L(u, v, x, y) du dv,$$

$$\frac{u-x}{u-x'} = \frac{z}{z'} = k,$$

$$L'(u, v, x', y') = L(u, v, kx' + (1-k)u, ky' + (1-k)v), \text{ and}$$

$$I'(x', y') = \int \int L(u, v, kx' + (1-k)u, ky' + (1-k)v) du dv,$$

wherein I and I' represent coordinate systems of a primary imaging surface and a secondary imaging surface; and L and L' represent energy of the primary imaging surface and the secondary imaging surface, and after acquisition of depth data of a photographed object in each micro-lens, the depth map of the whole image can be calculated, and a 3D video image can be shot.

16. The system of monitoring an unmanned aerial vehicle of claim 10, further comprising:

a classification means for classifying image frames of the video image;

a segmentation means for performing semantic segmentation on the image frames; and a detecting means for detecting the unmanned aerial vehicle image, and wherein instance segmentation is performed on the unmanned aerial vehicle image to cluster pixels of different objects.

17. The system of monitoring an unmanned aerial vehicle of claim 10, further comprising:

an analysis means for analyzing a super-resolution frame of the video image after the light field image is processed and decoded;

a remolding means for remolding a frame sequence in the video into a data matrix, for a given preprocessed monitoring video;

a feature extraction means for analyzing and encoding the data matrix to extract main features of an image; and an identification means for identifying an unmanned aerial vehicle image feature pattern by utilizing machine learning technology, and then detecting the unmanned aerial vehicle in the video image.

18. The system of monitoring an unmanned aerial vehicle of claim 17, wherein the machine learning technology is region-based convolutional neural networks (RCNN), Fast RCNN, You Only Look Once (real-time object detection, YOLO) or single shot detector (object detection, SSD) method.

* * * * *